(12) United States Patent
Martin et al.

(10) Patent No.: US 7,213,625 B2
(45) Date of Patent: May 8, 2007

(54) TREAD WHICH REDUCES RUNNING NOISE

(75) Inventors: Didier Martin, Chanat-La-Mouteyre (FR); Laurent Clero, Clermont-Ferrand (FR); Jean-Luc Bredoire, Cebazat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 115 days.

(21) Appl. No.: 10/627,758

(22) Filed: Jul. 28, 2003

(65) Prior Publication Data

US 2004/0016491 A1     Jan. 29, 2004

Related U.S. Application Data

(63) Continuation of application No. PCT/EP02/00852, filed on Jan. 28, 2002.

(30) Foreign Application Priority Data

Jan. 29, 2001    (FR) .................................. 01 01269

(51) Int. Cl.
*B60C 11/13*     (2006.01)

(52) U.S. Cl. ..................... 152/209.17; 152/209.22; 152/DIG. 3

(58) Field of Classification Search ........... 152/209.17, 152/209.18, 209.21, 209.22, DIG. 3
See application file for complete search history.

(56) References Cited

U.S. PATENT DOCUMENTS

| | | | | |
|---|---|---|---|---|
| 864,112 A | * | 8/1907 | Smith et al. ............ | 152/209.17 |
| 2,121,955 A | * | 6/1938 | Ernst ...................... | 152/DIG. 3 |
| 2,575,439 A | * | 11/1951 | Billingsley ............. | 152/209.17 |
| 3,532,147 A | | 10/1970 | Gough et al. | |
| 5,022,448 A | * | 6/1991 | Ochiai .................... | 152/209.17 |
| 5,088,536 A | * | 2/1992 | Graas et al. ........... | 152/209.22 |
| 6,143,223 A | * | 11/2000 | Merino Lopez ............. | 425/46 |
| 6,220,322 B1 | * | 4/2001 | Matsuura ................ | 152/209.22 |
| 6,315,018 B1 | * | 11/2001 | Watanabe ............... | 152/DIG. 3 |
| 6,408,910 B1 | * | 6/2002 | Lagnier et al. ........ | 152/209.17 |
| 6,484,772 B1 | * | 11/2002 | De Labareyre et al. . | 152/209.17 |
| 6,668,885 B2 | * | 12/2003 | Ishiyama ............... | 152/209.17 |

FOREIGN PATENT DOCUMENTS

DE                655 071              3/1941

(Continued)

*Primary Examiner*—Steven D. Maki
(74) *Attorney, Agent, or Firm*—Buchanan Ingersoll & Rooney PC

(57) ABSTRACT

A tire tread including a tread pattern formed by a plurality of motifs in relief defined by grooves oriented in the transverse direction and in the longitudinal direction of the tread, each of these motifs including a contact face and lateral faces, a plurality of these motifs in relief being connected two by two by at least two rubber connecting elements molded during the molding of the tread. These connecting elements define, with the opposing walls of the motifs in relief to which they are connected, a cavity which closes in contact with the roadway to trap and compress a volume of air once the wear of the tread reaches an appropriate level of wear. For each cavity thus formed at least one rubber element defining the cavity includes at least one orifice which passes completely through said rubber element to cause the volume of the cavity to communicate with a groove.

5 Claims, 3 Drawing Sheets

FOREIGN PATENT DOCUMENTS

| | | | |
|---|---|---|---|
| FR | 1580205 | | 9/1969 |
| FR | 2 715 891 | | 8/1995 |
| GB | 507254 | * | 6/1939 |
| JP | 2-303908 | * | 12/1990 |
| JP | 5-169913 | * | 7/1993 |
| JP | 6-135206 | * | 5/1994 |
| JP | 2001-130227 | * | 5/2001 |
| WO | 98/35842 | | 8/1998 |

* cited by examiner

TREAD WHICH REDUCES RUNNING NOISE

This application is a continuation of Application No. PCT/EP02/00852, filed on Jan. 28, 2002.

BACKGROUND OF THE INVENTION

The invention relates to a tread pattern for tires intended to be fitted on vehicles bearing heavy loads.

In order to obtain satisfactory performance in use, it is known to provide a tread with a tread pattern produced by molding and vulcanization of the rubber materials making up said tread. This tread pattern as a general rule comprises a plurality of motifs which are separated from each other by grooves intended to impart appropriate grip qualities to the tread.

A distinction is made in particular between grooves directed essentially in the longitudinal direction that is to say in the circumferential direction once the tread has been laid on a tire and grooves essentially directed in the transverse direction of the tread, that is to say in the axial direction on the tire.

For a tire fitted with a tread comprising a plurality of motifs in relief which are separated from each other by transverse grooves, towards the exit from the passage in the zone of contact of the tire with the ground, great flexing of the crown of the tire occurs, involving opening of said transverse grooves. These movements of cyclic opening (upon each rotation of the wheel) result in relative sliding between the motifs in relief and the ground which results in abnormally pronounced wear on the edges of the motifs in relief.

To limit these opening movements while maintaining the presence of transverse grooves which are necessary for the grip of the tire and for evacuating fluid present on the roadway, it is known to provide, at the time of molding the tread and the vulcanization thereof, for a plurality of rubber connecting elements to be produced by molding in order to ensure a mechanical connection between the main walls defining the grooves. In order to obtain a satisfactory mechanical effect in the case of a tread pattern for a tread for heavy-vehicle tires, it is known to form in a groove of depth P at least two connecting elements (or "rubber bridges") extending substantially transversely to the direction of said groove, said elements extending in the groove from a depth H as far as the bottom of this groove; each of these connecting elements has an appropriate width to ensure the mechanical strength of the motifs in relief while permitting a sufficient length of ridge to be maintained whatever the level of wear of the tread.

After partial wear of the tread (and before reaching the level of wear corresponding to the operating limit of this tread), these connecting elements come into contact with the roadway and will from that moment on become worn at the same time as the tread. Starting from the moment at which the rubber connecting elements come into contact with the roadway, a particularly appreciable increase in the noise emitted by the tire was noted, for example during travel on smooth ground.

SUMMARY OF THE INVENTION

The subject of the invention is to propose a tread provided with a tread pattern comprising a plurality of grooves of essentially transverse orientation defining motifs in relief, this tread not having the drawbacks which have been referred to above, while appreciably reducing the opening and closure movements on entering and exiting the contact imprint between the tire and the roadway to reduce the relative sliding between the tread pattern motifs and the roadway.

In particular, the tread according to the invention does not exhibit an increase in the noise level once the connecting elements come into contact with the roadway after partial wear of the tread.

To this end, the tread according to the invention comprises a tread pattern formed by a plurality of motifs in relief defined by grooves of depth P which are oriented in the transverse direction and in the longitudinal direction of the tread. Each motif comprises a contact face intended to come into contact with the roadway during travel of the tire fitted with this tread and the lateral faces. A plurality of motifs are joined two by two on their lateral faces by at least two rubber connecting elements molded during the molding of the tread, these connecting elements extending from a depth H beneath the running surface of the tread when new towards the bottom of the groove of depth P.

The connecting elements between two motifs in relief define, two by two with the walls of said motifs, a sort of reservoir forming a cavity which closes in contact with the roadway to trap and compress an equivalent volume of air once the wear of the tread reaches a level such that these connecting elements touch the ground (that is to say wear at least equal to the depth H). The tread pattern according to the invention is characterized in that for each cavity thus formed at least one rubber element defining said cavity comprises at least one orifice which passes completely through said rubber element to cause the volume of said cavity to communicate with a neighboring groove. This orifice is preferably molded at the time of molding the tread.

"Rubber element defining a cavity" is to be understood to mean either one of the connecting elements of the tread pattern motifs or one of said tread pattern motifs connected together by said connecting elements.

It is thus possible to produce an effective mechanical connection between motifs in relief arranged on the same longitudinal row on a tread while avoiding a significant increase in the sound level when this tread is fitted for example on a tire and when it achieves a level of wear which causes the connecting elements to come into contact with the roadway. Thus the advantages of a tread pattern cut by transverse grooves and those of a tread pattern comprising continuous ribs are combined.

Preferably, the form of the cross-section of the orifice(s) is selected so as to be practically insensitive to the compression of the rubber resulting from the contact with the roadway, which has a tendency to cause the closure of said orifice, which would substantially reduce or even cancel out the desired effect. From this perspective, it is advantageous for at least one orifice to have a cross-section of a form which is elongated in a direction perpendicular or virtually perpendicular to the running surface of the tread. "Elongated" in a given direction is understood to mean a geometric form, the maximum length of which is substantially oriented in said direction. Elliptical, rectangular or lozenge-shaped forms are particular examples thereof.

Preferably, at least one orifice extends as far as a depth at least equal to half of the difference between the depth P of the grooves and the depth Hi.

With the aim of avoiding an excessive reduction in the effect of rigidity of mechanical connection of the motifs of the tread pattern by connecting elements when the orifices are provided on these connecting elements, it is desirable to reduce as far as possible the cross-section of each orifice without the latter closing. For this, it is preferable to arrange each orifice as close as possible to one of the opposing faces of the motifs in relief which are connected by the connecting elements in order to benefit from the stiffening affect due to the motifs in relief themselves.

One advantageous variant consists of producing, on each tread pattern motif connected to another tread pattern motif by at least two connecting elements, at least one orifice having for example the form of a channel and passing through said motif to open out both on the lateral face of said motif defining a cavity and on another of the lateral faces of the same motif to facilitate the molding of such a tread pattern, there may be molded within each motif a channel filled with a material having the characteristic of being eliminated from the first kilometers' travel onwards, in particular under the action of humidity. Another possibility consists of molding, in the motifs in relief, an incision opening on to the contact face of these motifs (that is to say the face intended to be in contact with the ground during travel), said incision comprising, at a sufficient distance beneath the running surface, a widened part forming a channel to enable air to circulate.

Of course, it is entirely possible to combine the presence of orifices on the motifs in relief and on the connecting elements of said motifs.

BRIEF DESCRIPTION OF THE DRAWINGS

Other characteristics and advantages of the invention will become apparent from the description given hereafter with reference to the appended drawings, which show, by way of non-limitative examples, forms of embodiment of the subject of the invention.

In FIG. 1, there can be seen a partial view of two rubber blocks 1, 2 of a tread pattern of a tread for a heavy-vehicle tire. These blocks 1, 2 when new each have a surface, 10, 20 respectively, which is intended to come into contact with the roadway upon travel of a tire fitted with said tread. These two blocks 1 and 2 are separated in the longitudinal direction of the tread by a transverse groove 3 of depth P and of width L defining opposing main faces, 11 and 21 respectively, on said blocks.

Figure 1:
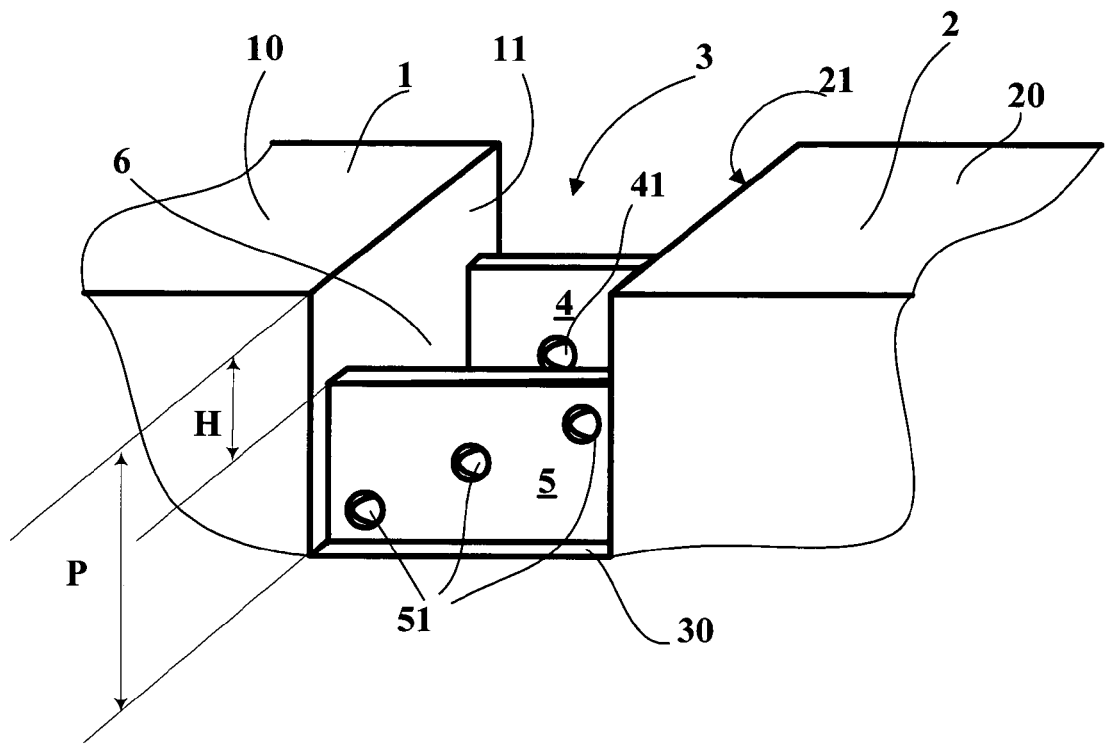
FIG. 1 shows two blocks connected by two rubber connecting elements according to the invention.

In order to stiffen the tread pattern comprising these rubber blocks in the longitudinal direction, there are molded at the time of molding the tread two rubber bridges 4 and 5, each bridge connecting the opposing faces 11 and 21. These bridges originate on the bottom 30 of the groove 3 and extend in the direction of the depth P of said groove 3 all to the same height H beneath the running surface. Alternatively, H could be zero so that the connecting elements extend from the running surface. These two bridges 4 and 5 define a cavity 6 with the walls 11 and 21 and the bottom 30 of the groove 3.

Figure 2:
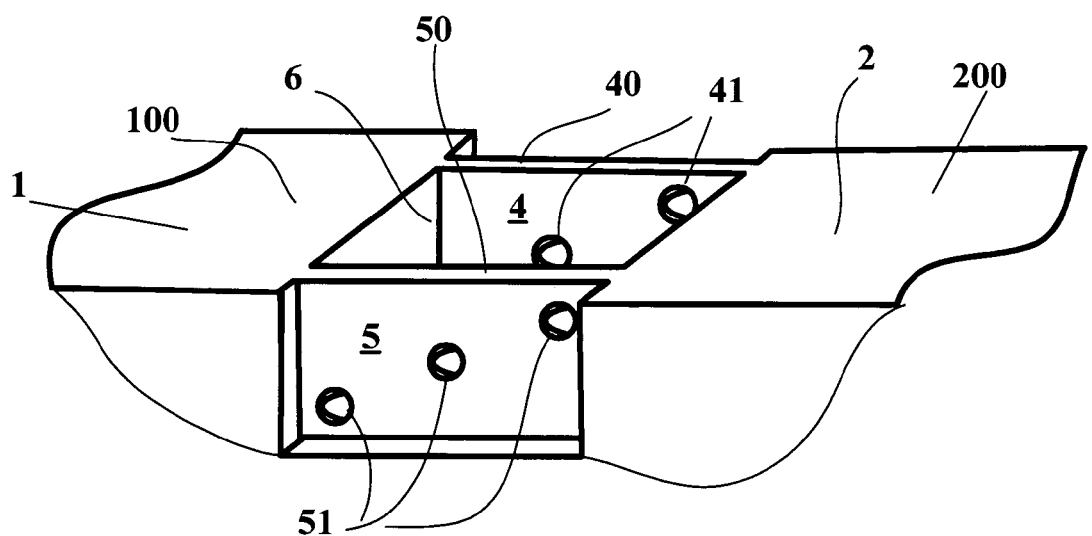
FIG. 2 shows the same blocks of FIG. 1 after wear sufficient for the rubber connecting elements to come into contact with the roadway.

In order to avoid the emission of noise during travel when the tread is worn to a depth at least equal to the depth H such that the bridges 4, 5 come into contact with the roadway as shown in FIG. 2, each of said connecting bridges is provided with three orifices, respectively 41, 51, which allow the cavity 6 to communicate with the rest of the groove 3. In this FIG. 2, the wear of the tread results in the formation of new contact surfaces for each block 1 and 2, 100 and 200 respectively, said contact surfaces being at the same level as the upper surfaces 40 and 50 of the bridges 4 and 5. Each orifice has a section of small dimensions compared with the dimensions of each bridge (height and length) and is of substantially circular shape.

Practically, these orifices are produced at the time of molding the tread, for example by arranging in the mould molding elements oriented substantially transversely relative to the tread, that is to say substantially in the direction of the transverse groove 3, as described for example in international application WO 98/54009.

Measurements were carried out on tires of dimension 315/80 R 22.5. The control tires comprised motifs in relief connected by two connecting elements devoid of orifice, whereas the tires according to the invention comprised motifs in relief connected by two connecting elements, each of said elements being provided with an orifice of section substantially equal to 7 mm$^2$. Noise measurements carried out close to the tire, that is to say with a microphone positioned close to the entry to and the exit from the contact imprint, in a running test at stabilized speed with the same vehicle on a smooth concrete track, showed that once the connecting elements were in contact with the roadway, the acoustic energy was on average less by 5 dBA for the tires according to the invention. A similar saving was also obtained in a running test under torque, for torques of between 140 and 250 m.daN per tire. The tires according to the invention significantly reduce the air pumping effect in the cavities formed by the connecting elements, avoiding any suction effect, which is particularly perceptible on smooth, closed ground, that is to say without any possible way for the air trapped in these cavities to escape.

In the variant shown in FIG. 3, there are shown two variants of orifice geometries which have advantages which will be described hereafter. To prevent the orifices from closing under the contact pressures existing between the rubber bridges and the roadway when the wear of the tread is sufficient, it is preferable to produce orifices having sections of elongate form substantially in the direction of the height of the bridge (that is to say in the direction of the depth of the groove). "Elongated substantially in the direction of the height" is to be understood to mean a form, the largest of the dimensions of which is oriented with said direction or alternatively forms a slight angle (less than 45°) to said direction.

Two blocks 1' and 2', viewed in longitudinal section, are connected by two rubber bridges extending from the bottom 30' of the groove 3' defining said blocks (only one bridge 7 is shown); this bridge 7 comprises two orifices 71 and 72 each having an elongated form, one being of elliptical form and the other of triangular form, the long sides of length A being oriented substantially in the direction of the depth.

Figure 3:
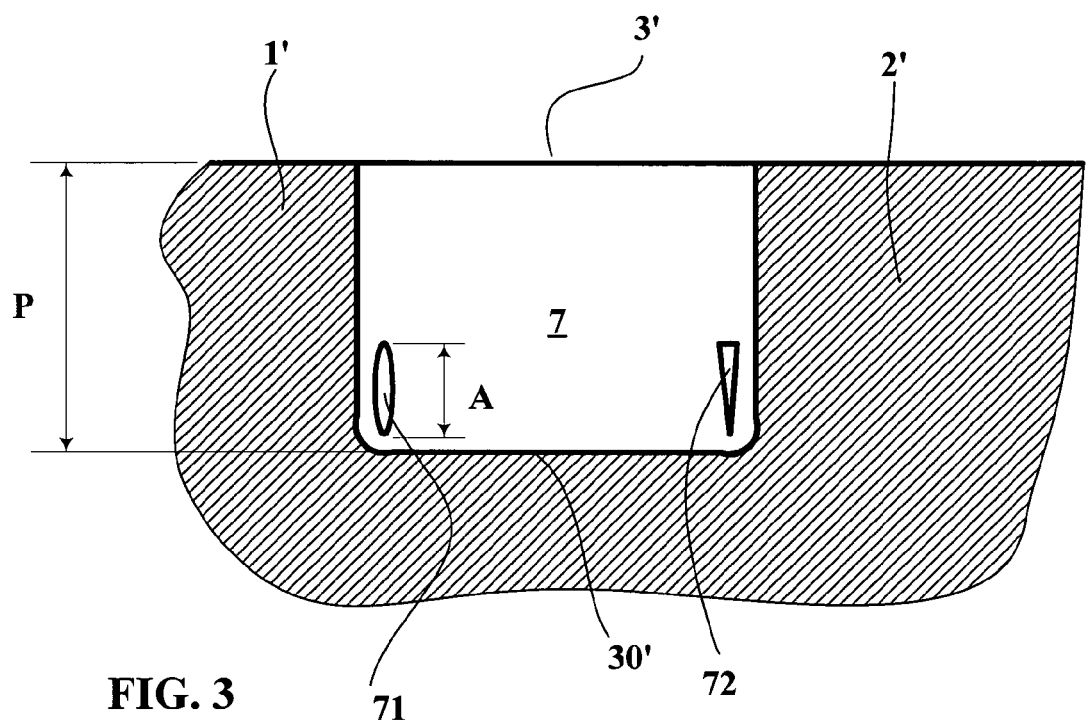
FIG. 3 shows a variant embodiment of orifices in a rubber bridge.

Furthermore and to reduce still further the risk of closing, it is judicious to arrange these orifices as close as possible to the opposing walls of the blocks 1 and 2 as shown in this FIG. 3, so that the compressive strength of the blocks 1 and 2 in the direction of the thickness of said blocks opposes the closure of these orifices.

In the variant shown in FIG. 3, the rubber bridges, when the tread is new, have a height equal to the depth P of the groove 3 (H=O) such that they are in contact with the roadway from when new.

Of course, a single one of the orifices shown is sufficient to prevent the cavity from being completely closed at the time of passing into contact.

Figure 4:
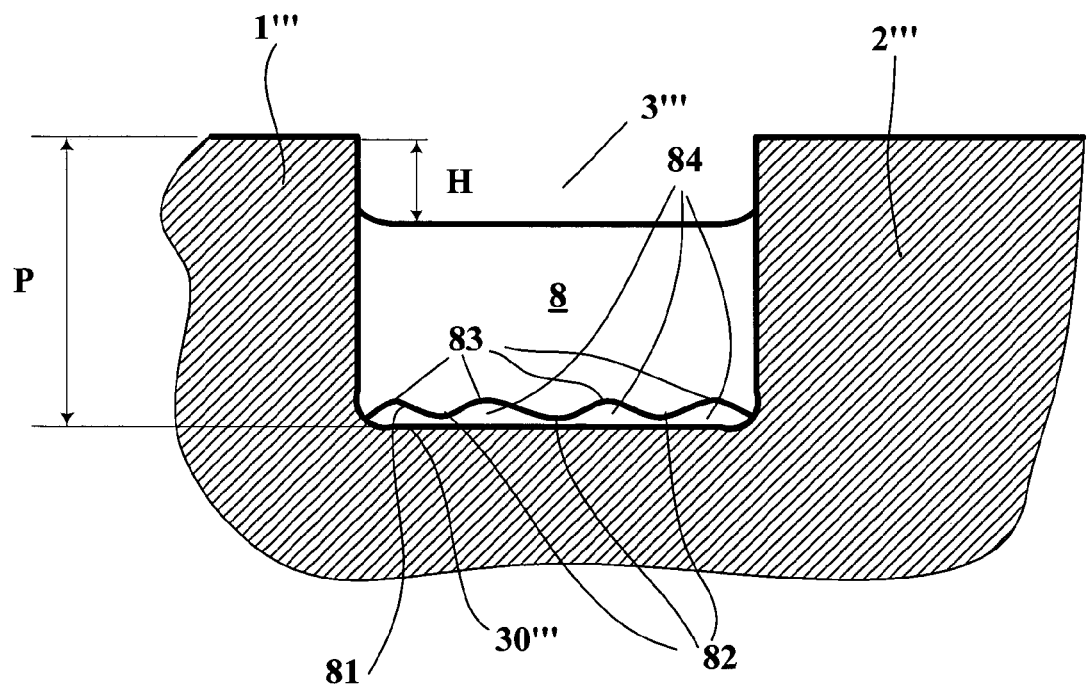
FIG. 4 shows a variant embodiment of a rubber bridge between two blocks according to the invention.

In another variant shown in FIG. 4, two rubber blocks 1" and 2" are connected by three rubber bridges 8, only one of which is shown in this figure, said bridges extending over a height H starting from the bottom 30" of the groove so as to cause the two cavities to communicate with the rest of the groove. Furthermore, each bridge 8 is not connected to the bottom 30" of the groove and has a lower face 81, the geometry of which is undulating so as to form humps 82 and hollows 83. As soon as the bridges 8 come into contact with the roadway, the contact pressures exerted by the roadway tend to bring the lower face 81 of the bridge 8 against the bottom 30" of the groove 3", the humps 82 being in contact against said bottom 30", whereas the hollows 83 form orifices 84 for evacuating the air occluded in the cavities formed by the bridges 8 and the blocks 1" and 2".

Figure 5:
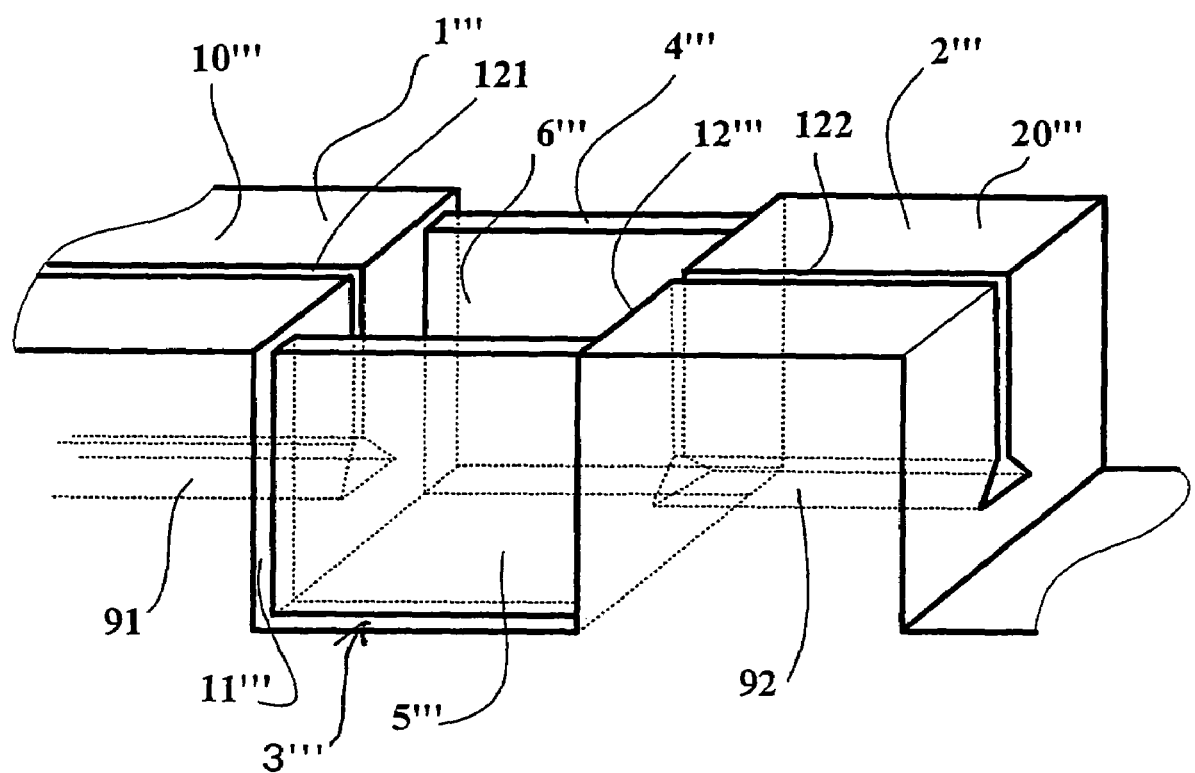
FIG. 5 shows another variant in which the tread pattern motifs connected by connecting elements comprise an evacuation channel.

A last variant is described with the aid of FIG. 5. Each of the two rubber blocks 1''' and 2''' shown as separated by a groove 3''' in this FIG. 5 comprises a contact face 10''', 20''' intended to come into contact with the ground during travel and four lateral faces, two of said lateral faces 11''' and 21''' being connected mechanically by two connecting elements 4''' and 5''' which are devoid of orifice. To avoid trapping air in the cavity 6''' formed by the lateral faces of the opposing blocks and the connecting elements 4''' and 5''' when these elements are in contact with the roadway after partial wear of the blocks 1''' and 2''', these blocks are provided with a channel 91, 92 opening into the cavity 6'''. Each channel 91, 92 of triangular section furthermore opens onto the opposite lateral face of the block and is extended towards the contact surface 10''', 20''' of said block by an incision 121, 122 of low width, that is to say of a width of at most 3 mm. This channel is of course positioned within the thickness of the block at a depth such that it is effective for the air trapped in the cavity to be able to escape once the connecting elements 4''', 5''' are in contact with the ground. The example shows that each channel opens onto opposite lateral faces, but it is also possible to make this channel open on to faces having a common ridge. A tread pattern of this type can be produced at the time of molding this tread by using molding elements of the lamella type provided with a widened part at their ends for molding a channel.

Another variant consists of providing for only one of the two blocks to be provided with a channel. Another variant embodiment consists of forming a channel which follows a non-rectilinear trajectory and extending it towards one of the faces of the block by an incision having a zigzag or undulating geometry in one or more directions. It is thus possible to limit the reduction in rigidity to the tread pattern linked to the presence of an incision in the blocks.

To increase further the effectiveness of evacuation, it is possible to combine both the presence of a channel in the motifs in relief and of orifices in the connecting elements.

The invention which has been described by means of examples is of course not limited to these examples, and various modifications can be made thereto without departing from the scope thereof.

What is claimed is:

1. A tire tread comprising a tread pattern formed by a plurality of motifs in relief which are defined by grooves oriented respectively in the transverse direction and in the longitudinal direction of the tread, each of these motifs comprising a contact face and lateral faces, a plurality of these motifs in relief being interconnected two by two by at least two rubber connecting elements molded in a respective ones of the grooves during the molding of the tread, these connecting elements defining, with the opposing walls of the motifs in relief to which they are connected, a cavity which closes in contact with the roadway to trap and compress a volume of air, at least one of the rubber connecting elements comprising at least one orifice passing through the whole of said at least one rubber connecting element to cause the volume of said cavity to communicate with a groove, wherein the at least one orifice has an elongated form in a direction substantially perpendicular to the running surface of the tread, and wherein the at least one orifice is arranged as close as possible to one of the opposing faces of said motifs so as to be practically insensitive to the compression of the rubber resulting from the contact with the roadway and thus prevent its closure.

2. The tire tread according to claim 1 wherein the connecting elements extend from a depth H beneath the running surface of the tread, when new, towards the bottom of the groove, wherein the cavity is formed once the wear of the tread reaches a level of wear equal to H.

3. The tread according to claim 2 wherein the at least one orifice extends as far as a depth at least equal to half the difference between a depth P of the grooves and the depth H.

4. The tire tread according to claim 3 wherein the connecting elements extend from the running surface of the tread.

5. A tire tread comprising a tread pattern formed by a plurality of motifs in relief which are defined by grooves oriented respectively in the transverse direction and in the longitudinal direction of the tread, each of these motifs comprising a contact face and lateral faces, a plurality of these motifs in relief being interconnected two by two by at least two rubber connecting elements molded in a respective ones of the grooves during the molding of the tread, these connecting elements defining, with the opposing walls of the motifs in relief to which they are connected, a cavity which closes in contact with the roadway to trap and compress a volume of air, at least one of the rubber connecting elements comprising at least one orifice passing through the whole of said at least one rubber connecting element to cause the volume of said cavity to communicate with a groove, wherein the at least one orifice is formed between the bottom of a groove and the respective connecting element in said groove, the geometry of the lower face of said connecting element comprising humps for preventing complete closure of said at least one orifice on passing into the contact so as to be practically insensitive to the compression of the rubber resulting from the contact with the roadway and thus prevent its closure.

* * * * *